United States Patent
Park et al.

(10) Patent No.: US 7,844,185 B2
(45) Date of Patent: Nov. 30, 2010

(54) METHOD AND APPARATUS FOR SUPPRESSING OPTICAL SURGE IN OPTICAL BURST SWITCHING NETWORK

(75) Inventors: Keun-joo Park, Yongin-si (KR); Hyun-chin Kim, Seoul (KR); June-koo Rhee, Seongnam-si (KR); Young-kwang Seo, Seoul (KR); Chun-ju Youn, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 745 days.

(21) Appl. No.: 11/264,165

(22) Filed: Nov. 2, 2005

(65) Prior Publication Data

US 2006/0093357 A1    May 4, 2006

(30) Foreign Application Priority Data

Nov. 2, 2004    (KR)    ............... 10-2004-0088352

(51) Int. Cl.
*H04B 10/12*    (2006.01)
(52) U.S. Cl. ............... 398/175; 398/177; 359/341.43; 359/337.12
(58) Field of Classification Search .......... 398/173, 398/175, 177; 359/341.41, 341.42, 341.43, 359/337.1, 337.12
See application file for complete search history.

(56) References Cited

U.S. PATENT DOCUMENTS

| | | | |
|---|---|---|---|
| 6,177,814 B1 * | 1/2001 | Taguchi | ............... 327/58 |
| 6,426,817 B1 * | 7/2002 | Tomita | ............... 398/82 |
| 6,437,908 B2 * | 8/2002 | Shiozaki et al. | ......... 359/341.43 |
| 6,738,184 B2 * | 5/2004 | Hayashi et al. | .......... 359/341.4 |
| 6,907,201 B1 * | 6/2005 | Frankel | ............... 398/158 |
| 2003/0072337 A1 * | 4/2003 | Miguelez et al. | ............... 372/34 |

FOREIGN PATENT DOCUMENTS

JP    09-331095 A    12/1997

OTHER PUBLICATIONS

Korean Office Action dated May 28, 2010 in corresponding KR Application No. 10-2004-0088352.

* cited by examiner

*Primary Examiner*—Nathan M Curs
(74) *Attorney, Agent, or Firm*—Sughrue Mion, PLLC

(57) ABSTRACT

Apparatuses and methods are provided which suppress a surge component occurring at an optical amplifier on an optical path through which an optical burst signal is transmitted. An optical amplifier may experience a surge due to the power variation of the optical burst signal that is fed to the optical amplifier. To suppress such a surge component, a power corresponding to a number of wavelengths of an optical burst signal to be input is calculated. The optical amplifier is instructed to generate an optical signal with a power corresponding to a difference between a set value and the calculated power. The generated optical signal and the optical burst signal to be input are coupled and output according to the instruction. Thus, the optical amplifier can receive the optical signal with the constant power and the surge component at the optical amplifier can be suppressed.

13 Claims, 5 Drawing Sheets

METHOD AND APPARATUS FOR SUPPRESSING OPTICAL SURGE IN OPTICAL BURST SWITCHING NETWORK

CROSS-REFERENCE TO RELATED APPLICATIONS

This application claims priority from Korean Patent Application No. 2004-88352, filed on Nov. 2, 2004 in the Korean Intellectual Property Office, the entire disclosure of which is incorporated herein by reference.

BACKGROUND OF THE INVENTION

1. Field of the Invention

Apparatuses and methods consistent with the present invention relate to optical burst switching networks, and more particularly, to suppressing a surge occurring at an optical amplifier in an optical burst switching network.

2. Description of the Related Art

In general, an optical signal may be classified into an optical circuit signal, an optical packet signal, or an optical burst signal. An optical circuit signal uses a preset optical path. In contrast, an optical packet signal and an optical burst signal do not use a preset optical path.

FIG. 1 illustrates nodes that transmit and receive an optical signal over an optical communication network. Hereinafter, operations of the nodes are described according to the type of the optical signal in reference to FIG. 1. It should be understood that each node includes an optical switch therein. The optical switch sets an optical path for the transmission of the optical signal according to a control signal. The transmission of an optical circuit signal is first explained.

FIG. 1 shows a node A 100 through a node E 108. It is assumed that node A 100 generates or receives an optical circuit signal destined for the node E 108. Thus, node A 100 is required to set an optical path to deliver the optical circuit signal to node E 108. To this end, node A 100 transmits to a node C 104 a route request message that contains the address of node A 100 (source address), an address of the node E 108 (destination address), and the type and the number of the optical signal. Node C 104 analyzes the destination address contained in the received route request message. Node C 104 then recognizes that the destination address of the route request message matches the address of node E 108. Thus, node C 104 establishes the optical path using the recognized location of node E 108.

Node C 104 transmits the received route request message to node E 108 along the optical path that is established. Node E 108 recognizes that the destination address of the received route request message is its address. Hence, node E 108 transmits a route response message along the optical path of the route request message. Node C 104 forwards the received route response message to node A 100.

Consequently, the optical path is established between node A 100 and node E 108. After the optical path is established, node A 100 transmits the optical circuit signal to node E 108. Note that node C 104 manipulates the optical switch to output the received optical circuit signal to node E 108. As mentioned above, the transmission of the optical circuit signal requires establishing the optical path in advance, which causes to delay the transmission time of the optical circuit signal. In addition, the established optical path for the transmission of the optical circuit signal is used exclusively until the transmission of the optical circuit signal is completed. In other words, the optical switch maintains the current switching state until the transmission of the optical circuit signal is completed.

The following is an explanation of the transmission of the optical packet signal. Upon generating the optical packet signal, node A 100 provides node C 104 with an optical label signal containing optical packet signal information. The information contained in the optical label signal is analogous to the information contained in the route request message used for the transmission of the optical circuit signal.

Node A 100 transmits the optical packet signal to node C 104 substantially concurrently with the optical label signal. Upon receiving the optical label signal, node C 104 can recognize that the following optical packet signal has to be delivered to node E 108. Hence, node C 104 manipulates the optical switch to output the received optical packet signal to node E 108. As a result, the signal transmission time can be reduced and the delivery path of the optical signal is not exclusively used, in contrast to transmission of an optical circuit signal.

The transmission scheme of the optical burst signal is similar to that of the optical packet signal. A difference lies in that the optical burst signal is transmitted by the burst while the optical packet signal is transmitted by the packet. The burst is an aggregation of a plurality of packets. Upon generating a plurality of optical packet signals, node A 100 generates a burst from the plurality of the optical packet signals and transmits the burst to node C 104.

Typically, the optical signal transmitted through an optical fiber decreases the power of the optical signal due to several reasons. In this regard, the optical fiber is provided with an optical amplifier to amplify the decreased power of the optical fiber at intervals. As illustrated in FIG. 1, an optical amplifier 110 is located between node C 104 and node E 108. Although FIG. 1 illustrates only one optical amplifier 110, more than one optical amplifier can be equipped in the optical communication network according to a user's setup. The following explains characteristics of optical amplifier 110.

Generally, optical amplifier 110 employs an erbium-doped fiber amplifier (EDFA). The EDFA uses 1.55 μm wavelength which has a minimal loss on the optical fiber. The EDFA incurs loss below 50 dB similar to a semiconductor laser amplifier, and the EDFA can carry out the amplification regardless of the polarization degree of the light.

FIG. 2 shows the relationship of a power and a gain of the input optical signal at the EDFA. The gain is the power of the output optical power with respect to the power of the input optical signal. Generally, the EDFA has the constant power of the output optical signal regardless of the power of the input optical signal. Accordingly, the EDFA operates to provide a high gain for an input optical signal having a low power and a low gain for an input optical signal having a large power. In FIG. 2, when the power of the input optical signal is −40 dBm, the gain is about 34 dB, and when the power of the input optical signal is 0 dBm, the gain is about 10 dB.

FIG. 3 depicts the powers of the input optical signal and the output optical signal at the EDFA. Particularly, FIG. 3 depicts a first section where the power of the input optical signal is zero, and a second section where the power of the input optical signal is X (X is an arbitrary constant more than zero). In the first section, as illustrated in FIG. 1, when the power of the input optical signal is zero, the power of the output optical signal is also zero regardless of the gain level. Meanwhile, even if the power of the input optical signal is zero, the EDFA operates to output the output optical signal with a higher gain, generally, the highest gain as shown in FIG. 2.

In the second section, the optical signal with the power X is input to the EDFA. The EDFA amplifies and outputs the input optical signal. Even when the power of the input optical signal changes at a specific point, the gain gradually changes over a certain time period. At the start point of the second section, the EDFA amplifies the power of the output optical signal to the gain corresponding to the power zero of the input optical signal, rather than to the gain corresponding to the power X of the input optical signal. Such amplification is illustrated in FIG. 3. In short, when the power of the input optical signal abruptly changes, the surge component is generated in the output optical signal.

The surge component shortens the life span of devices on the optical path, and causes damage to the devices. Furthermore, the surge component may result in distortion of the output optical signal. Therefore, a solution is required to suppress the surge component that occurs in the output optical signal.

FIG. 4 depicts a construction of a conventional node 420 which suppresses the surge component from the output optical signal. Node 420 includes an optical brancher 400, a delayer 402, an optical coupler 404, an optical detector 410, a controller 412, and an optical signal generator 414. The optical path, which carries the optical signal from node 420, includes an optical amplifier 406 and optical filter 408.

Optical brancher 400 branches the power of the optical signal input to node 420 into two. The wavelength of the optical signal fed into optical brancher 400 is $\lambda 1$. Typically, optical brancher 400 branches the power of the input optical signal into the ratio of 9 to 1. Thus, optical brancher 400 provides delayer 402 with the branched optical signal having $9/10$ power, and provides optical detector 410 with the optical signal having $1/10$ power.

Delayer 402 delays the input optical signal over a certain time period and provides the delayed optical signal to optical coupler 404. The delay time at delayer 402 is a time taken for the optical signal fed to optical detector 410 to arrive at optical coupler 404 via controller 412 and optical signal generator 414. Optical detector 410 detects the power of the input optical signal and provides the measured power and the input optical signal to controller 412.

Controller 412 determines whether the measured power of the optical signal equals zero. If the power of the optical signal is zero, controller 412 controls optical signal generator 414 to generate an optical signal having the same power as the power of an optical signal. If the measured power of the optical signal is not zero, controller 412 forwards the received optical signal to optical signal generator 414, rather than controlling generation of the optical signal.

Upon receiving the direction to generate the optical signal, optical signal generator 414 generates the optical power having a preset power and provides the generated optical signal to optical coupler 404. The wavelength of the optical signal generated at optical signal generator 414 is $\lambda d$. If there is no direction to generate the optical signal, optical signal generator 414 forwards the received optical signal to optical coupler 404.

Optical coupler 404 couples the optical signals received from delayer 402 and optical signal generator 414. Next, optical coupler 404 outputs the optical signal having a constant power. Optical coupler 404 provides the coupled optical signal to optical amplifier 406. Optical amplifier 406 amplifies the optical signal fed from optical coupler 404, and optical filer 408 filters the input optical signal. Optical amplifier 406 amplifies the optical signal with a constant gain as the received optical signal having constant power. Optical filter 408 passes only the optical signal with the wavelength $\lambda 1$ among the optical signals, and blocks the optical signal having the wavelength $\lambda d$.

FIG. 5 depicts the optical signal output from the optical coupler 404. The optical signal is fed into optical coupler 400 is in a period from t0 to t1, and a period from t2 to t3. Optical signal generator 414 generates the optical signal in the period from t1 to t2, and the period after t3. In short, the optical signal generator 414 generates the optical signal during the periods in which the optical signal is not input to the optical brancher 400. In addition, the wavelength of the optical signal generated at optical signal generator 414 is similar to that of the optical signal input to optical brancher 400 so as to be blocked at optical filter 408, and that the power of the generated optical signal is the same as that of the optical power input to optical brancher 400.

However, when optical amplifier 406 suppresses the surge component as shown in FIG. 4, an additional construction is required to branch the optical signal and the input optical signal is subject to delay, as a result. Furthermore, as the optical signal passes through optical detector 410, controller 412, and optical signal generator 414, the optical signal is subject to distortion, loss, and the like.

SUMMARY OF THE INVENTION

An aspect of the present invention provides a method for suppressing a surge component occurring at an optical amplifier that amplifies an optical signal.

Another aspect of the present invention provides a method for outputting an optical signal with a constant power from an optical amplifier regardless of a power of the optical signal that is input to a node.

Still another aspect of the present invention provides a method for preventing loss and distortion of an optical signal by suppressing a surge component occurring at an optical amplifier.

To achieve the above and other aspects of the present invention, a method for suppressing a surge component occurring due to a power variation of an input optical burst signal in an optical burst switching network is provided, which includes: calculating a power corresponding to a number of wavelengths of an optical burst signal to be input; instructing generation of an optical signal that has a power corresponding to a difference between a set value and the calculated power; and coupling and outputting the generated optical signal and the optical burst signal to be input.

In accordance with the above aspects of the present invention, an apparatus for suppressing a surge component occurring due to a power variation of an input optical burst signal in an optical burst switching network, includes: a surge component suppressor that instructs generation of an optical signal that has a power corresponding to a difference between a set value and a power that corresponds to a number of wavelengths in an optical burst signal to be input; and an optical amplifier that couples and outputs the generated optical signal and the input optical burst signal.

Additional and/or other aspects of the invention will be set forth in part in the description which follows and, in part, will be obvious from the description, or may be learned by practice of the invention.

BRIEF DESCRIPTION OF THE DRAWING FIGURES

These and/or other aspects of the invention will become apparent and more readily appreciated from the following description of exemplary embodiments, taken in conjunction with the accompanying drawing figures of which:

DETAILED DESCRIPTION OF THE EXEMPLARY EMBODIMENTS OF THE INVENTION

Figure 1:
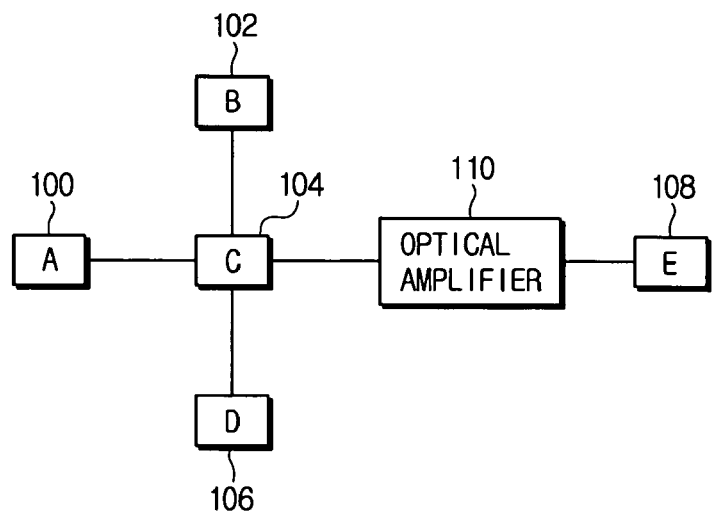
FIG. 1 illustrates an optical network including a plurality of nodes.
Figure 2:
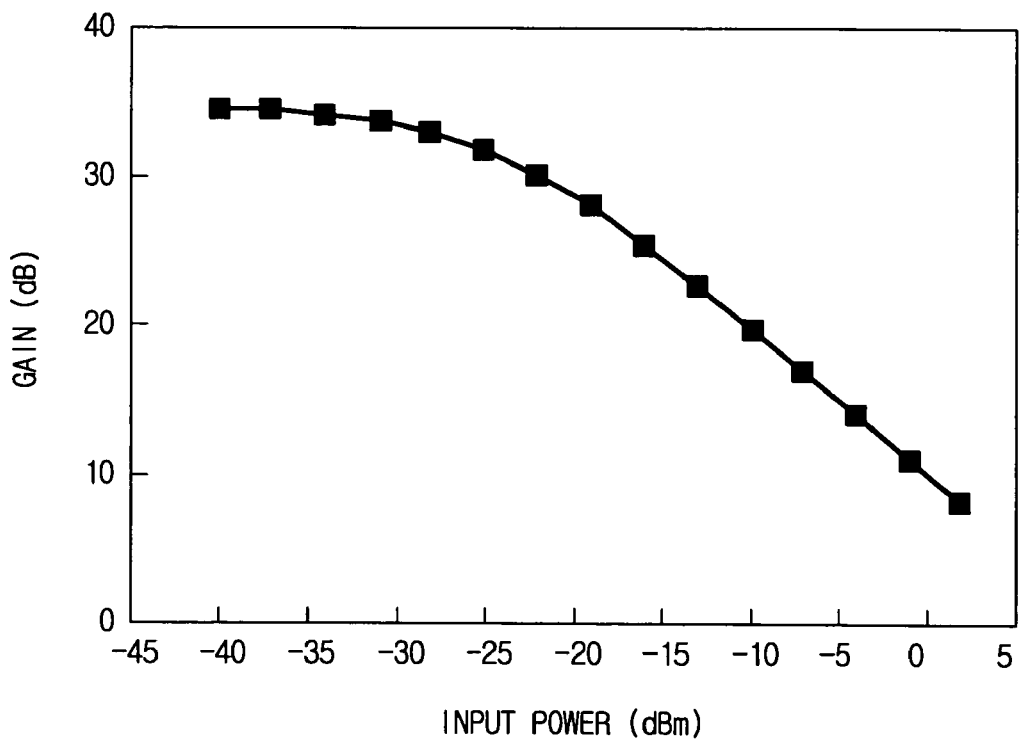
FIG. 2 illustrates a gain with respect to an input optical signal at an optical amplifier.
Figure 3:
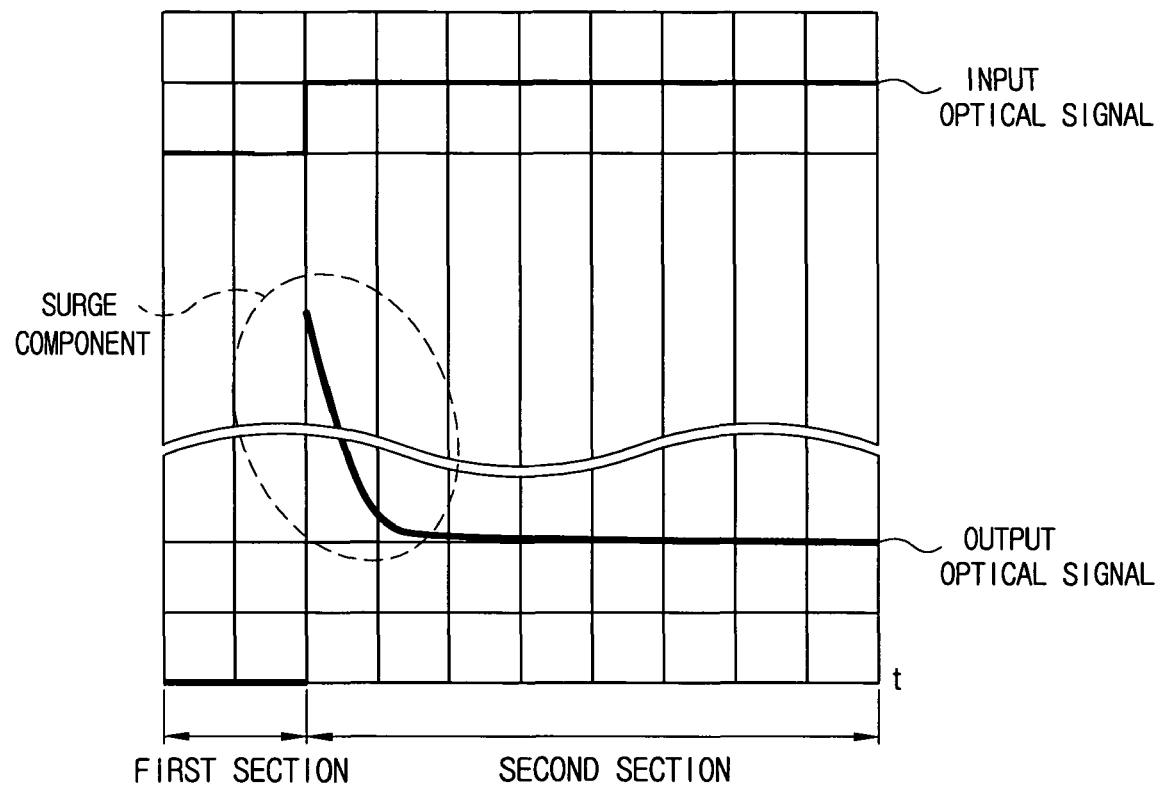
FIG. 3 illustrates a power of an output optical signal according to variation of the power of the input optical signal at the optical amplifier.

Reference will now be made in detail to the exemplary embodiments of the present invention, examples of which are illustrated in the accompanying drawings, wherein like reference numerals refer to like elements throughout. The exemplary embodiments are described below to explain the present invention by referring to the figures.

Aspects of the present invention provide a method for suppressing a surge component that occurs at an optical amplifier.

Figure 6:
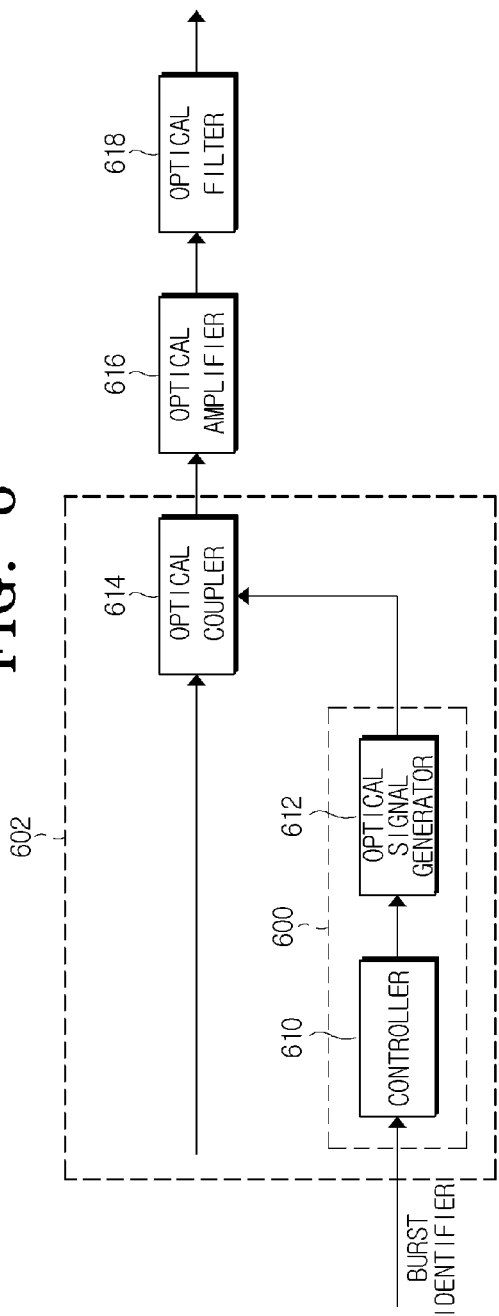
FIG. 6 illustrates a construction of a node that suppresses a surge component occurring at an optical amplifier according an exemplary embodiment of the present invention.

FIG. 6 depicts a node for suppressing a surge component occurring at an optical amplifier, and an optical path according to an exemplary embodiment of the present invention. Node 602 includes a surge component suppressor 600 and an optical coupler 614. Surge component suppressor 600 includes a controller 610 and an optical signal generator 612. It should be appreciated that node 602 and surge component suppressor 600 may include other elements. The optical path includes an optical amplifier 616 and an optical filter 618.

In node 602, which transmits and receives an optical packet signal and an optical burst signal, controller 610 knows the power of the optical signal input to node 602. Typically, the optical signal with one wavelength has the constant power. Thus, the number of wavelengths of the incoming optical signal is proportional to the power of the optical signal.

As mentioned in the related art, node 602 receives a route request message before receiving the optical signal. Hereinafter, the route request message is a burst identifier. The burst identifier may contain information related to an identifier of a source node, an identifier of a destination node, the number of bursts carried, and a wavelength and the number of wavelengths of the optical signal to be transmitted. Accordingly, node 602 can acquire the number of the wavelengths used for the incoming optical burst signal before the optical burst signal is received. Thus, information of the burst identifier is known to controller 610. As for the small number of the wavelengths of the optical burst signal input to node 602, specifically, to optical coupler 614, controller 610 controls optical signal generator 612 to output an optical signal having a high power. As for the large number of the wavelengths input to node 602, controller 610 controls optical signal generator 612 to output an optical signal having a low power. In short, the power of the optical signal generated at optical signal generator 612 varies, unlike the power of optical burst signals fed into node 602.

Optical coupler 614 couples the optical burst signal fed to node 602 and the optical signal received from optical signal generator 612. Optical coupler 614 provides the coupled optical signal to optical amplifier 616. The power of the optical signal output from optical coupler 614 is constant. Optical amplifier 616 amplifies and outputs the received optical signal. By receiving the optical signal with constant power, optical amplifier 616 amplifies the optical signal at a constant gain. Optical filter 618 filters out the optical burst signal alone, which is fed to node 602, from the optical signal received from optical amplifier 616.

Figure 4:
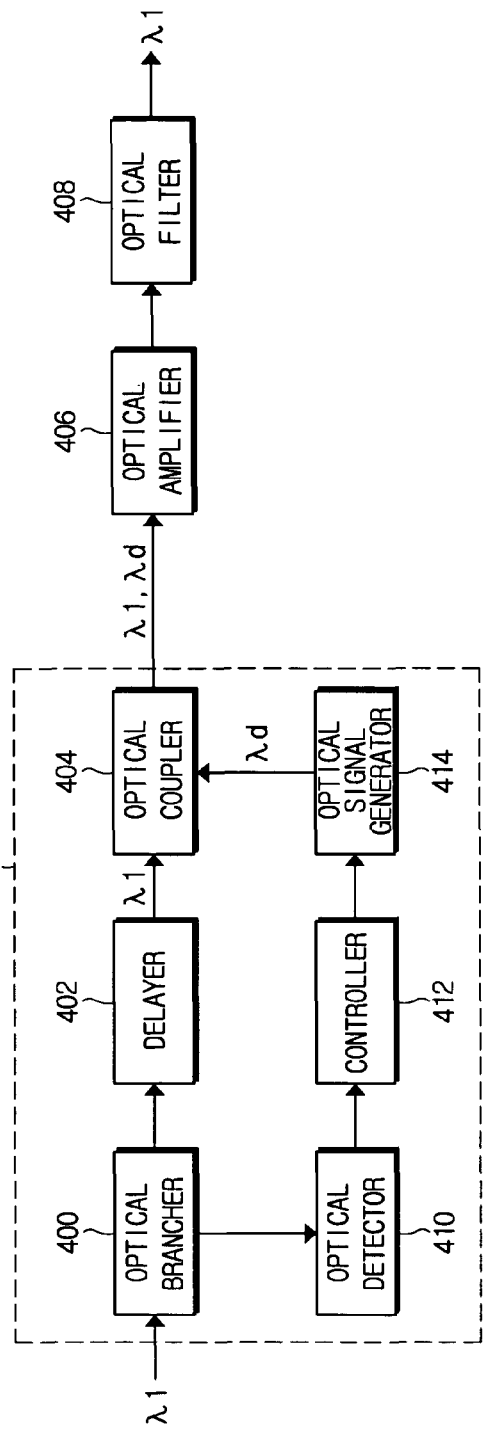
FIG. 4 illustrates a construction of a node that suppresses a surge component occurring at the conventional optical amplifier.
Figure 5:
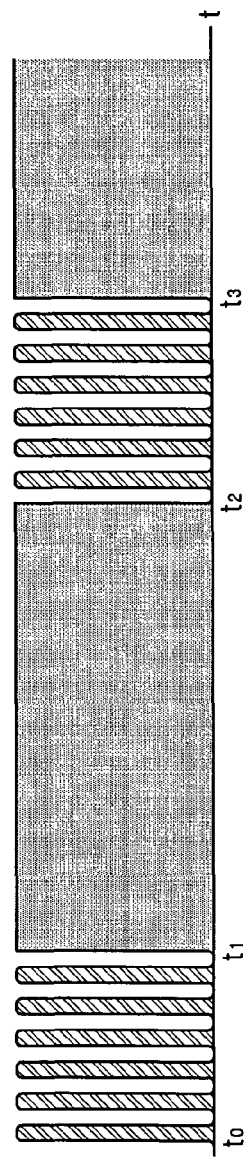
FIG. 5 illustrates an optical signal generated at an optical signal generator to suppress the surge component occurring at the conventional optical amplifier.

In FIG. 6, node 602 does not need an optical brancher, a delayer, and an optical detector. Thus node 602 may be implemented with a simpler construction than the conventional node 420 illustrated in FIG. 4.

Figure 7:
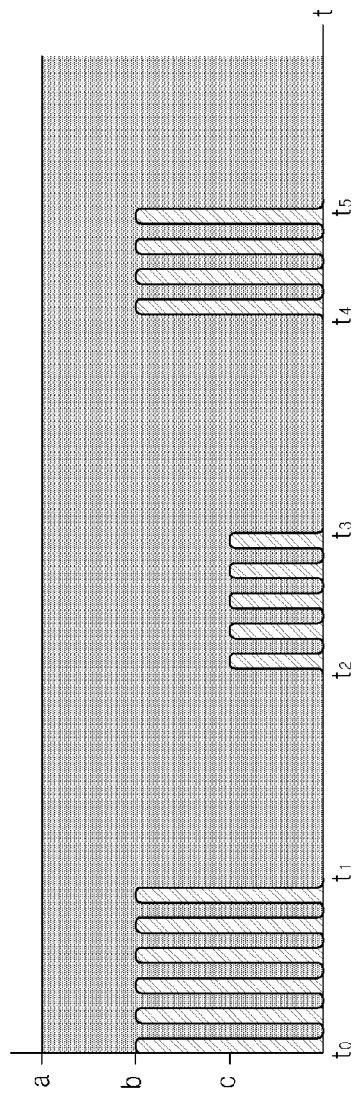
FIG. 7 illustrates an optical signal generated at an optical signal generator to suppress the surge component occurring at the optical amplifier according to an exemplary embodiment of the present invention.

FIG. 7 depicts the optical signal that is output from optical coupler 614. Operations of controller 610 and optical signal generator 612 are explained with reference to FIG. 7.

In FIG. 7, node 602 receives the optical burst signal in a period from t0 to t1, a period from t2 to t3, and a period from t4 to t5. The received optical burst signal is fed to the optical coupler 614 in node 602. Suppose that the power of the optical burst signal input in the period from t2 to t1 is '2a', that of the optical burst power input in the period from t2 to t3 is 'a'. The power of the optical burst signal input in the period from t4 to t5 is '2a'. In short, if the number of the wavelengths of the optical burst signal in the period from t0 to t1 is 2, then the number of wavelengths of the optical burst signal in the period from t2 to t3 is 1. Further, the number of the wavelengths of the optical burst signal in the period from t4 to t5 is 2. This is because, as mentioned above, the power of the optical burst signal transmitted on a single wavelength is constant.

Controller 610 controls optical signal generator 612 to generate an optical signal with the power 'a-b' in the period from t0 to t1 and the period from t4 to t5. Controller 610 controls optical signal generator 612 to generate an optical signal with the power 'a' in the period from t1 to t2, in the period from t3 to t4, and the period after t5. Controller 610 controls optical signal generator 612 to generate an optical signal with the power 'a-c' in the period from t2 to t3.

Figure 8:
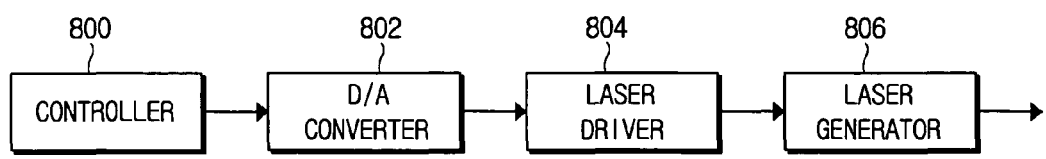
FIG. 8 illustrates a construction of a surge component suppressor according to an exemplary embodiment of the present invention.

FIG. 8 is a block diagram of surge component suppressor 600. Surge component suppressor 600 includes a controller 800, a digital-to-analog (D/A) converter 802, a laser driver 804, and a laser generator 806. It is to be understood that surge component suppressor 600 can include other elements.

Controller 800 analyzes the number of the wavelengths used for the optical burst signal fed to node 602. Controller 800 calculates the difference between the analyzed number of the wavelengths and a set value. The set value is the number of the wavelengths corresponding to the power 'a' of FIG. 7 of the optical signal to be output from optical coupler 614. Controller 800 can store information relating to the set value and the numerical difference of the wavelengths used for the input optical burst signal, in a table. Controller 800 can reduce the processing time by using the table to store the information relating to the numerical difference of the wavelengths.

Controller 800 provides the information related to the numerical difference of the wavelengths used for the input optical burst signal to D/A converter 802. Then, controller 800 digitizes and provides the information related to the numerical different to D/A converter 802. For instance, when controller 800 does not instruct generation of the optical signal, '00' may be transferred to D/A converter 802. When controller 800 instructs generation of the optical power to be the same power as the optical signal having one wavelength, '01' may be transferred to D/A converter 802. Further, when the controller 800 instructs generation of the optical signal to be the same power as the optical signal having two wavelengths, '10' may be transferred to D/A converter 802.

D/A converter 802 converts the received digital value to a corresponding analog value. The analog value output from D/A converter 802 indicates a voltage. The converted voltage is provided to laser driver 804. Then, laser driver 804 calculates the electric current corresponding to the received voltage and provides the calculated current to laser generator 806.

Laser generator 806 outputs an optical signal having the power corresponding to the received current. For a high current, the laser generator 806 outputs the optical signal with the high power, and for a low current, the optical signal with the low power is output from laser generator 806. The wavelength of the optical signal generated at laser generator 806 is constant. Hence, optical filter 618 can block only the optical signal generated at laser generator 806.

Figure 9:
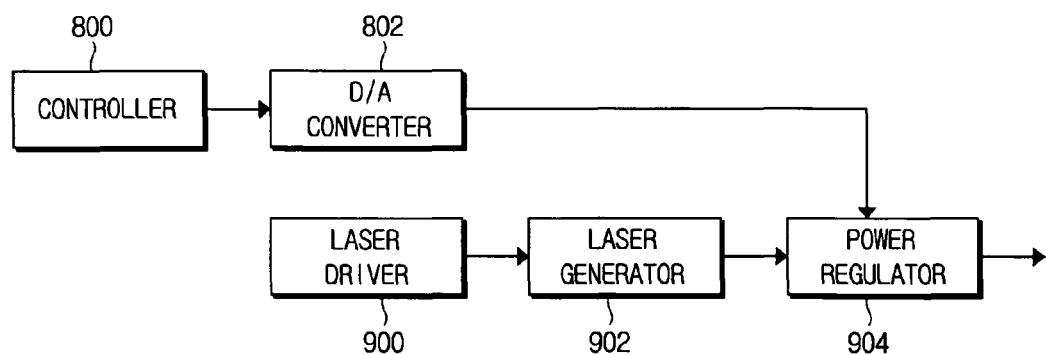
FIG. 9 illustrates a construction of a surge component suppressor according to another exemplary embodiment of the present invention.

FIG. 9 is a block diagram of the surge component suppressor 600 according to another exemplary embodiment of the present invention. Surge component suppressor 600 includes a controller 800, a D/A converter 802, a laser driver 900, a laser generator 902, and a power regulator 904. Controller 800 and D/A converter 802 in FIG. 9 operate similar to those described in FIG. 8. Laser driver 900 outputs the constant current regardless of the power of the optical signal fed to node 602. Likewise, laser generator 902 generates an optical signal with the constant power.

The output signal from laser generator 902 is provided to power regulator 904. Power regulator 904 receives from D/A converter 802 the digital value corresponding to the power of the optical signal to be delivered to optical amplifier 616. Power regulator 904 regulates the power of the optical signal received from laser generator 902 based on the received digital value.

As set forth above, the acquired information and the elements are utilized to suppress the surge component occurring at the optical amplifier in the optical communication network, without having to employ unnecessary additional elements. Furthermore, the distortion or the delay of the input optical signal can be prevented.

Although exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A method for suppressing a surge component occurring due to a power variation of an input optical burst signal in an optical burst switching network, comprising:
    calculating a power that corresponds to a number of wavelengths of an optical burst signal to be input;
    instructing generation of an optical signal that has a power that corresponds to a difference between a set value and the power that is calculated; and
    coupling and outputting the optical signal which is generated and the optical burst signal to be input,
    wherein the number of wavelengths of the optical burst signal to be input is provided using a burst identifier, and
    wherein the burst identifier comprises information indicating a location of a destination address.

2. The method according to claim 1, wherein the number of wavelengths of the optical burst signal to be input is proportional to the calculated power.

3. The method according to claim 1, wherein the instructing generation of the optical signal comprises:
    providing an electric current that corresponds to the difference between the set value and the power that is calculated; and
    instructing generation and output of an optical signal that corresponds to an amount of the electric current that is provided.

4. The method according to claim 1, wherein the instructing generation of the optical signal further comprises:
    generating an optical signal that has a constant power; and
    instructing output of a power of the optical signal that is generated, wherein the power is regulated using the difference between the set value and the power that is calculated.

5. The method according to claim 1, wherein the set value is a maximum number of wavelengths of an optical signal that is receivable on an optical path.

6. An apparatus for suppressing a surge component occurring due to a power variation of an input optical burst signal in an optical burst switching network, comprising:
    a surge component suppressor that instructs generation of an optical signal that has a power that corresponds to a difference between a set value and a power that corresponds to a number of wavelengths in an optical burst signal to be input; and
    an optical amplifier that couples and outputs the optical signal that is generated and the optical burst signal that is input,
    wherein the controller receives the number of the wavelengths of the optical burst signal to be input using a burst identifier,
    wherein the burst identifier comprises information indicating a location of a destination address.

7. The apparatus according to claim 6, wherein the surge component suppressor comprises:
    a controller that instructs generation of an optical signal that has the power that corresponds to the difference between the set value and the power that corresponds to the number of wavelengths in the optical burst signal to be input; and
    an optical signal generator that generates the optical signal that is instructed by the controller.

8. The apparatus according to claim 7, wherein the optical signal generator comprises:
    a laser driver that generates and outputs an electric current that corresponds to the difference that is received; and
    a laser generator that generates an optical signal based on the electric current that is received from the laser driver.

9. The apparatus according to claim 8, further comprising:
    a digital-to-analog (D/A) converter that calculates a voltage that corresponds to the difference, which is received from the controller, and provides the voltage that is calculated to the laser driver.

10. The apparatus according to claim 7, wherein the optical signal generator further comprises:
    a laser generator that outputs an optical signal with a constant power based on the electric current that is received; and a power regulator that regulates the power of the optical signal that is received from the laser generator using the difference that is received.

11. The apparatus according to claim 10, further comprising:
a D/A converter that calculates a voltage that corresponds to the difference received from the controller, and provides the calculated voltage to the power regulator.

12. A method for suppressing a surge component occurring due to a power variation of an input optical burst signal in an optical burst switching network, comprising:
calculating a power that corresponds to a number of wavelengths of an optical burst signal to be input;
instructing generation of an optical signal that has a power that corresponds to a difference between a set value and the power that is calculated; and
coupling and outputting the optical signal which is generated and the optical burst signal to be input,
wherein the number of wavelengths of the optical burst signal to be input is provided using a burst identifier,
wherein the burst identifier comprises at least one of: an identifier of a source node, an identifier of a destination node, and a number of bursts carried.

13. An apparatus for suppressing a surge component occurring due to a power variation of an input optical burst signal in an optical burst switching network, comprising:
a surge component suppressor that instructs generation of an optical signal that has a power that corresponds to a difference between a set value and a power that corresponds to a number of wavelengths in an optical burst signal to be input; and
an optical amplifier that couples and outputs the optical signal that is generated and the optical burst signal that is input,
wherein the controller receives the number of the wavelengths of the optical burst signal to be input using a burst identifier,
wherein the burst identifier comprises at least one of: an identifier of a source node, an identifier of a destination node, and a number of bursts carried.

* * * * *